United States Patent
Vakilzadeh et al.

(10) Patent No.: US 12,488,439 B2
(45) Date of Patent: Dec. 2, 2025

(54) RECONSTRUCTION OF IMAGE FRAMES

(71) Applicant: Zenseact AB, Gothenburg (SE)

(72) Inventors: Majid Khorsand Vakilzadeh, Mölndal (SE); Mina Alibeigi, Gothenburg (SE)

(73) Assignee: Zenseact AB, Gothenburg (SE)

( * ) Notice: Subject to any disclaimer, the term of this patent is extended or adjusted under 35 U.S.C. 154(b) by 397 days.

(21) Appl. No.: 18/164,758

(22) Filed: Feb. 6, 2023

(65) Prior Publication Data
US 2023/0260089 A1    Aug. 17, 2023

(30) Foreign Application Priority Data
Feb. 14, 2022   (EP) .................................... 22156484

(51) Int. Cl.
*G06T 5/00* (2024.01)
*G06T 5/50* (2006.01)
(Continued)

(52) U.S. Cl.
CPC ............ *G06T 5/73* (2024.01); *G06T 5/50* (2013.01); *G06T 7/20* (2013.01); *G06T 2207/30252* (2013.01)

(58) Field of Classification Search
CPC .... G06T 5/73; G06T 5/50; G06T 7/20; G06T 2207/30252; G06T 2207/20201;
(Continued)

(56) References Cited

U.S. PATENT DOCUMENTS

| 2019/0220011 A1* | 7/2019 | Della Penna | G07C 5/0841 |
| 2020/0081431 A1* | 3/2020 | Weiss | G05D 1/224 |

FOREIGN PATENT DOCUMENTS

| CN | 107895492 A * | 4/2018 | G08G 1/04 |
| CN | 113902859 A * | 1/2022 | G06T 17/05 |

(Continued)

OTHER PUBLICATIONS

European Search Report dated Jul. 12, 2022 for Patent Application No. 22156484.2 filed Feb. 14, 2022, consisting of 10-pages.
(Continued)

*Primary Examiner* — Mekonen T Bekele
(74) *Attorney, Agent, or Firm* — Weisberg I.P. Law, P.A.

(57) ABSTRACT

An image frames handling system for reconstruction of image frames obtained by an image capturing device of an Automated Driving System, ADS, of a vehicle at an entity. The image system stores in a surrounding state data buffer obtained object-level environmental data indicating states of vehicle surroundings derived from perception data output from an onboard perception system; stores image frames of vehicle surroundings captured by the capturing device in an image data buffer; processes the image data buffer to determine motions of objects in the image frames and respective values of the motions; extracts key image frames from the image data buffer and pixels having motion values exceeding a predeterminable level from non-key image frames of the image data buffer; transfers the extracted key image frames and the extracted pixels; and reconstructs at the entity interpolated image frames at the predeterminable frame rate based on the selected data.

18 Claims, 3 Drawing Sheets

(51) Int. Cl.
*G06T 5/73* (2024.01)
*G06T 7/20* (2017.01)

(58) Field of Classification Search
CPC ........... G06T 2207/20221; G06T 7/246; G06T 3/4038; G06V 20/56; G06V 20/46
See application file for complete search history.

(56) References Cited

FOREIGN PATENT DOCUMENTS

FR   2960300 A1 * 11/2011 ............. G01S 13/90
KR   20190106844 A * 8/2019

OTHER PUBLICATIONS

F. Brandi et al.; Super-Resolution of Video Using Key Frames and Motion Estimation; 2008 15th IEEE International Conference on Image Processing; Jan. 1, 2008, consisting of 4-pages.

* cited by examiner

RECONSTRUCTION OF IMAGE FRAMES

TECHNICAL FIELD

The present disclosure relates to reconstruction at an entity offboard a vehicle of image frames obtained by an image capturing device of an ADS of said vehicle.

BACKGROUND

Within the automotive field, there has for quite some years been activity in the development of autonomous vehicles. An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. Moreover, in a not-too-distant future, Autonomous Driving, AD, will to a greater extent find its way into modern vehicles. AD along with ADAS will herein be referred to under the common term Automated Driving System, ADS, corresponding to all different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

It is widely accepted within the automotive industry that a massive amount of data is needed to prove that ADSs will behave safely enough once launched on public roads. One approach to alleviate this problem is to monitor the performance of ADSs once on the public roads. The common practice for field monitoring is to monitor interesting events and/or scenarios in the field—e.g. measure key performance indicators, KPIs, indicating the ADS performance—and trigger freezing a buffer of all data in the vehicle once an interesting event and/or scenario occurs—e.g. once the ADS shows poor performance and/or upon exposure to a new environmental scenario or a rare behavioural scenario around the ADS—and transfer said data to a central entity for further processing and/or analysis. One type of such analysis is to feed the transferred data to a resimulation—also commonly referred to as resim—toolchain, to trace e.g. the underlying fault in the ADS, and to show that the e.g. problem is circumvented by improving the feature. However, resimulating—or resimming—the full SW stack requires the raw sensor data at a full sampling rate. The complete sensor setups of an ADS, however, generate huge amounts of data. Thus, freezing sensor data at a full sampling rate not only increases the demand for memory allocation in the vehicle, but also enhances the cost of the data transfer to the back office. In other words, the idea of fleet monitoring relies on the ability to freeze buffer(s) of entire data available in the vehicle, including data from sensors, public buses and application interfaces, upon fulfilling a triggering condition. However, an ADS with its full sensor setup may generate a huge amount of data per second, most of which is generated by one or more surrounding detecting sensors such as cameras. This not only demands a large memory onboard each customer vehicle but also increases the volume and cost of data being transferred to the central entity for the development and verification of autonomous driving technology. One straightforward approach is to reduce the volume of data by buffering camera images at a lower frame rate. However, this hinders the possibility of resimulation of the full SW stack on the transferred data in the central entity for e.g. fault trace purposes. Also, buffering the camera images at a lower frame rate increases the chance of missing some critical information in the dropped images, such as e.g. missing an onset of a critical scenario.

SUMMARY OF THE INVENTION

It is therefore an object of embodiments herein to provide an approach for in an improved and/or alternative manner enabling reconstruction, at an entity offboard a vehicle, of image frames obtained by an image capturing device of an ADS of said vehicle.

The object above may be achieved by the subject-matter disclosed herein. Embodiments are set forth in the appended claims, in the following description, and in the drawings.

The disclosed subject-matter relates to a method performed by an image frames handling system for reconstruction at an entity offboard a vehicle of image frames obtained by an image capturing device of an ADS of the vehicle. The image frames handling system stores in a surrounding state data buffer, obtained object-level environmental data indicating states of vehicle surroundings derived from perception data output from an onboard perception system configured to estimate surroundings of the vehicle. The image frames handling system further stores in an image data buffer, at a predeterminable frame rate, image frames of vehicle surroundings captured by the image capturing device. Moreover, the image frames handling system processes the image data buffer to determine motions of objects in the image frames and respective values of said motions. Furthermore, the image frames handling system extracts key image frames from the image data buffer. Moreover, the image frames handling system extracts from non-key image frames of the image data buffer, pixels comprising motion values exceeding a predeterminable level. The image frames handling system further transfers to the entity selected data comprising the surrounding state data buffer, the extracted key image frames and the extracted pixels. Moreover, the image frames handling system reconstructs at the entity, interpolated image frames at the predeterminable frame rate, based on the selected data.

The disclosed subject-matter further relates to an image frames handling system for—and/or adapted for—reconstruction at an entity offboard a vehicle, of image frames obtained by an image capturing device of an ADS of the vehicle. The image frames handling system comprises a surrounding state storing unit for storing in a surrounding state data buffer obtained object-level environmental data indicating states of vehicle surroundings derived from perception data output from an onboard perception system configured to estimate surroundings of the vehicle. The image frames handling system further comprises an image frames storing unit for storing in an image data buffer at a predeterminable frame rate, image frames of vehicle surroundings captured by the image capturing device. Moreover, the image frames handling system comprises a buffer processing unit for processing the image data buffer to determine motions of objects in the image frames and respective values of said motions. Furthermore, the image frames handling system comprises a key frames extracting unit for extracting key image frames from the image data buffer. The image frames handling system further comprises a pixels extracting unit for extracting from non-key image frames of the image data buffer, pixels comprising motion values exceeding a predeterminable level. Moreover, the image frames handling system comprises a transferring unit for transferring to the entity selected data comprising the surrounding state data buffer, the extracted key image frames and the extracted pixels. Furthermore, the image frames handling system comprises a reconstructing unit for reconstructing at the entity, interpolated image frames at the predeterminable frame rate, based on the selected data.

Furthermore, the disclosed subject-matter relates to an arrangement, for instance a vehicle, comprising a surrounding state storing unit, an image frames storing unit, a buffer processing unit, a key frames extracting unit, a pixels extracting unit and a transferring unit—and potentially further an event detecting unit and/or a buffer freezing unit—of an images frames handling system as described herein, and/or for instance an entity, comprising a reconstructing unit of an image frames handling system as described herein Moreover, the disclosed subject-matter relates to a computer program product comprising a computer program containing computer program code means arranged to cause a computer or a processor to execute the steps of an image frames handling system described herein, or the storing object-level environmental data step, the storing image frames step, the processing image data buffer step, the extracting key frames step, the extracting pixels step and the transferring selected data step—and potentially the detecting an event step and/or the freezing step—of an image frames handling system described herein, and/or the reconstructing interpolated image frames step of an image frames handling system described herein, stored on a computer-readable medium or a carrier wave.

The disclosed subject-matter further relates to a non-volatile computer readable storage medium having stored thereon said computer program product.

Thereby, there is introduced an approach enabling image frames of an image capturing device—e.g. camera—of an ADS-equipped vehicle, to be accurately reconstructed at an offboard entity such as a back office. That is, since there is stored in a surrounding state data buffer obtained object-level environmental data indicating states of vehicle surroundings derived from perception data output from an onboard perception system configured to estimate surroundings of the vehicle, there is continuously and/or intermittently buffered onboard the vehicle—e.g. as the vehicle is traveling—data indicative of states of the vehicle's surroundings, from world views as perceived by an ADS perception system. Moreover, that is, since there is stored in an image data buffer at a predeterminable frame rate, image frames of vehicle surroundings captured by the image capturing device, there is—in addition to there being stored object-level environmental data indicating states of vehicle surroundings—in parallel continuously and/or intermittently buffered onboard the vehicle—e.g. at full frame rate—images of the vehicle's surroundings derived from an at least first onboard image capturing device. Furthermore, that is, since the image data buffer is processed to determine motions of objects in the image frames and respective values of said motions, the buffered image frames are assessed—e.g. following detection of an event e.g. a safety critical event and potentially subsequent a freezing of the surrounding state data buffer and image data buffer—to establish optical flow(s) therein. Accordingly, there is identified pattern(s) of apparent, significant and/or abrupt motions of objects, surfaces and/or edges in the image frames and/or in regions or pixels thereof—which may signify interesting and/or important information—and gradients of respective motion are computed. Moreover, that is, since there is extracted key image frames from the image data buffer, there is selected and/or identified out of the image data buffer—e.g. based on predeterminable selection criteria and/or a set frequency—image frames which may be referred to as key, core and/or selected image frames, with the remaining image frames being considered and/or referred to as non-key and/or dropped image frames. Furthermore, that is, since there is extracted from non-key image frames of the image data buffer, pixels comprising motion values exceeding a predeterminable level, there is selected in dropped image frames, respective pixels and/or pixel regions having and/or being associated with gradients of the optical flow exceeding a set motion value threshold and/or limit. Accordingly, pixels and/or regions with sufficient motion values—which may signify interesting and/or important information and further be referred to as hot spots—are filtered out from the non-key image frames. Moreover, that is, since there is transferred to the entity, selected data comprising the surrounding state data buffer, the extracted key image frames and the extracted pixels, there is in addition to the surrounding state data buffer being offloaded to the offboard entity, additionally offloaded to said entity—rather than the entire image data buffer—the key image frames thereof at full resolution along with the non-key image frames extracted pixels having motion values exceeding the set motion value threshold. Accordingly, data of interest for further assessment, analysis, processing and/or resimulation at the offboard entity, may be transmitted with a limited and/or reduced data volume, in that—although the surrounding state data buffer is provided to the entity at full and/or high sampling rate—the image frames are provided to said entity at a downsampled rate, i.e. at a limited e.g. lower frame rate, with merely the key image frames—and not the dropped frames—being transmitted at full resolution. Furthermore, that is, since there is reconstructed at the entity interpolated image frames at the predeterminable frame rate based on the selected data, images—such as the dropped image frames—may be reconstructed based on the key image frames in combination with the—in the non-key image frames comprised—pixels comprising motion values exceeding the predeterminable level and the—in the surrounding state data buffer comprised—object-level environmental data indicating states of vehicle surroundings. Accordingly, images in between key image frames may be reconstructed and/or interpolated to increase the image frame rate and/or reach the predeterminable e.g. full frame rate, using as input the key image frames along with the non-key image frames pixels with sufficient value/gradient of optical flow, and world views e.g. baseline world views. For instance, for plural time stamps, there may be interpolated a respective specific image frame of a specific time stamp based on key image frames of neighbouring time stamps in combination with non-key image frame extracted pixels at said specific time stamp—which raw image data enables reconstructing a more realistic interpolated image frame—and object-level environmental data of said specific time stamp. The introduced concept thus suggests transferring key frames with full resolution—to not lose information—and dropping middle frames that can be reconstructed with a high resolution using the object-level environmental data and pixels at hot spots. This subsequently enables accurately reconstructing images at the offboard entity, e.g. back office, while at the same time minimizing the risk of missing objects or important information in dropped images. In other words, there is provided an approach that—as compared to offloading image frames at full frame rate—substantially may reduce the size of data required to be offloaded from the vehicle, while at the same time preserving essential characteristics and/or information of such image frames and enabling constructing said image frames at a e.g. full frame rate at the offboard entity, with high accuracy.

Thus, with the suggested approach, there is transferred from the vehicle to the offboard entity, lowered frame rate image frames—i.e. the key image frames—together with the non-key image frames extracted pixels and the surrounding state data buffer, to enable restoring the predeterminable e.g. full frame rate data with sufficient accuracy at the offboard entity. That is, there is suggested to construct object-level environmental data of vehicle surroundings—e.g. a baseline worldview—in the vehicle and send it at a high sampling rate together with the downsampled image data buffer to the offboard entity, in order to at said entity enable reconstruction of images at a predeterminable e.g. full frame rate. This enables the reconstruction process to consume the information in the object-level environmental data to ensure that important features are preserved in the reconstructed images. Accordingly, there is enabled reconstruction of all the frames with high resolution and/or accuracy at the offboard entity without losing e.g. safety critical information in the dropped frames. That is, dropping images and reconstructing the dropped images at the offboard entity only based on neighbouring frames, would potentially cause missing some important objects and/or events in the dropped frames. To circumvent this problem, there is thus suggested to use object-level environmental data of vehicle surroundings to reconstruct the dropped images and make sure that at least e.g. safety critical events are captured in the reconstructed image(s). In the vehicle, optical flows are extracted from the stored image frames at the predeterminable e.g. full frame rate, thus enabling detection of regions in an image frame with high gradients of the optical flow, or significant motion, which commonly contain interesting and/or important information. Then transferring pixels around such regions to the offboard entity as input to the reconstruction process, enables accuracy of the reconstructed images to be increased.

For that reason, an approach is provided for in an improved and/or alternative manner enabling reconstruction at an entity offboard a vehicle, of image frames obtained by an image capturing device of an ADS of said vehicle.

The technical features and corresponding advantages of the above-mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to reconstruction at an entity offboard a vehicle, of image frames obtained by an image capturing device of an ADS of said vehicle, there will be disclosed an approach enabling image frames of an image capturing device—e.g. camera—of an ADS-equipped vehicle, to be accurately reconstructed at an offboard entity such as a back office.

Figure 1:
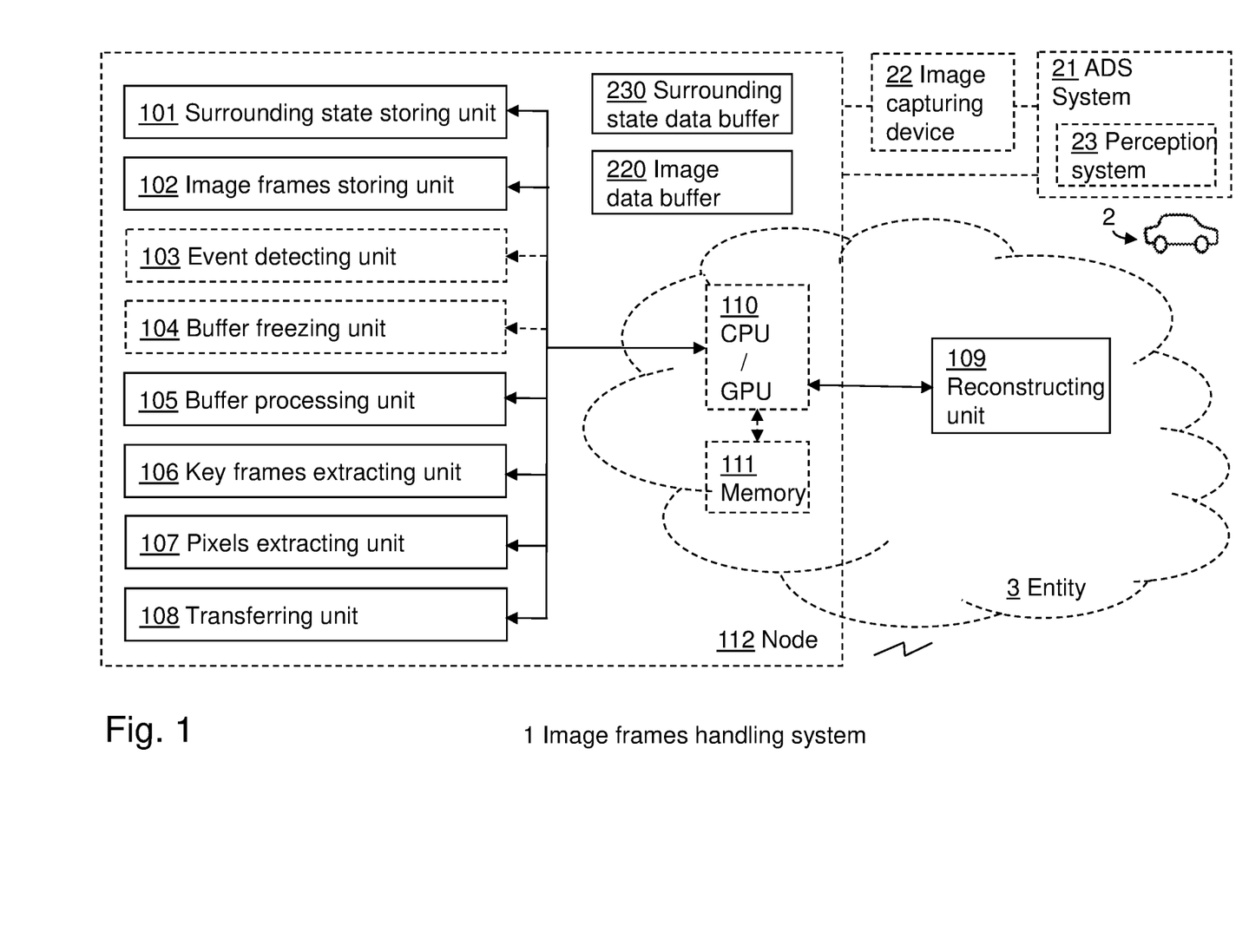
FIG. 1 is a schematic block diagram illustrating an exemplifying image frames handling system according to embodiments of the disclosure.

Referring now to the figures, there is depicted in FIG. 1 a schematic block diagram of an exemplifying image frames handling system 1 according to embodiments of the disclosure. The image frames handling system 1 is adapted for reconstruction at an entity 3 offboard a vehicle 2, of image frames obtained by an image capturing device 22 of an ADS 21 of the vehicle 2.

The vehicle 2—which may be referred to as host vehicle or ego-vehicle—may be represented by any arbitrary—e.g. known—manned or unmanned vehicle, for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle", and according to an example further to "production vehicle", "launched vehicle", "road-traffic vehicle" and/or "public road vehicle". Moreover, the ADS 21 on-board the vehicle 2 may be represented by any arbitrary ADAS or AD system e.g. known in the art and/or yet to be developed. Moreover, the vehicle 2 and/or ADS 21 may comprise, be provided with and/or have onboard a perception module and/or system 23 adapted to estimate surroundings of the vehicle 2, and subsequently adapted to estimate world views of the surroundings e.g. with support from a—e.g. commonly known—digital map (not shown) such as a high definition, HD, map, and/or an equivalent and/or successor thereof. The perception system 23 may refer to any commonly known system, module and/or functionality, e.g. comprised in one or more electronic control modules, ECUs, and/or nodes of the vehicle 2 and/or the ADS 21, adapted and/or configured to interpret sensory information—relevant for driving of the vehicle 2—to identify e.g. objects, obstacles, vehicle lanes, relevant signage, appropriate navigation paths etc. The perception system 23—which may be adapted to support e.g. sensor fusion, tracking, localization etc.—may thus be adapted to rely on sensory information. Such exemplifying sensory information may, for instance, be derived from one or more—e.g. commonly known—sensors comprised in and/or provided onboard the vehicle 2 adapted to sense and/or perceive the vehicle's 2 whereabouts and/or surroundings, for instance represented by one or a combination of one or more of surrounding detecting sensors, such as image capturing devices 22 e.g. camera(s), radar(s), lidar(s), ultrasonics etc., and/or a positioning system, odometer, inertial measurement units etc. In other words, a perception system 23 is in the present context thus to be understood as a system responsible for acquiring raw sensor data from on-board sensors, such as from surrounding detecting sensors etc., and converting this raw data into scene understanding. The image capturing device 22 described herein may be represented by any arbitrary feasible at least first image capturing device—e.g. camera—onboard the vehicle 2 adapted and/or configured to capture vehicle surroundings. The entity 3 offboard the vehicle 2, on the other hand, may be represented by any feasible image reconstruction-supporting entity, such as e.g. a back office, data center, central entity, server(s), and/or database(s) etc., remote from the vehicle 2. The phrase "for reconstruction at an entity" may refer to "for image reconstruction at an entity" and/or "for efficient reconstruction at an entity", whereas "entity offboard a vehicle" may refer to "entity remote from a vehicle", "image reconstruction-supporting entity offboard a vehicle" and/or "data center and/or back office offboard a vehicle". The phrase "image frames handling system", on the other hand, may refer to "image frames down/up-sampling system", "image frames processing system" and/or "computational system", whereas "a method performed by an image frames handling system" may refer to "an at least partly computer-implemented method performed by an image frames handling system". Moreover, "image frames obtained by an image capturing device" may refer to "images captured by an image capturing device", "image frames captured by a camera" and/or "image frames derived from an image capturing device", whereas "image capturing device of an ADS" may refer to "image capturing device associated with an ADS" and/or "onboard image capturing device of an ADS".

As illustrated in an exemplifying manner in exemplifying FIG. 1, the image frames handling system 1 is—e.g. by means of a surrounding state storing unit 101—adapted and/or configured for storing in a surrounding state data buffer 230 obtained object-level environmental data indicating states of vehicle surroundings derived from perception data output from an onboard perception system 23 configured to estimate surroundings of the vehicle 2. Thereby, e.g. as the vehicle 2 is traveling, there is continuously and/or intermittently buffered and/or derived onboard the vehicle 2, data indicative of states of the vehicle's 2 surroundings, from world views as perceived by an ADS perception system 23.

The object-level environmental data may be represented by any feasible data indicative of states of the vehicle's 2 surroundings, and be of any feasible format and/or size. The object-level environmental data may furthermore be—and/or have been—derived from perception data of the perception system 23—in any feasible manner. According to an example, however, the object-level environmental data indicating states of vehicle surroundings may be represented by corroborated and/or enhanced environmental data, i.e. corroborated and/or enhanced world views which e.g. may be referred to as ground truth e.g. production ground truth and/or baseline world views. Such corroborated and/or enhanced object-level environmental data—and/or ground truth and/or baseline world views—may for instance be accomplished through post-processing of at least a portion and/or range of the perception data and/or by running at least a portion and/or range of the perception data through backward filter(s), which may increase the accuracy of object-level data and minimizes the probability of missing important information in the surrounding of the ADS 21. Further details relating to accomplishing production ground truth and/or baseline worldviews may be found in the European Patent Application No. EP3812954, and will for the sake of brevity and conciseness not be further elaborated upon herein. The object-level environmental data may be stored in any arbitrary feasible—e.g. known—manner onboard the vehicle 2, and similarly, the surrounding state data buffer 230—which e.g. may be referred to as an object-level environmental data buffer and/or merely a data buffer—may be represented by any arbitrary number of buffers of any feasible size(s), and further for instance be represented by at least a first ring buffer and/or FIFO buffer. Moreover, the object-level environmental data stored, may cover any feasible time period, of any feasible duration, for instance ranging from a few seconds or even less than a second, up to tens of seconds or even minutes. The perception system 23, on the other hand, may be represented by any feasible—e.g. known—perception system configured to estimate surroundings of the vehicle 2, and for instance be represented by such a perception system 23 discussed in conjunction with the description of an ADS 21 above. The phrase "storing in a surrounding state data buffer obtained object-level environmental data" may refer to "storing in an at least first surrounding state data buffer obtained object-level environmental data", "buffering obtained object-level environmental data", "storing in a surrounding state data buffer continuously and/or intermittently obtained object-level environmental data", "storing in a data buffer e.g. ring data buffer obtained object-level environmental data", "storing onboard said vehicle in a surrounding state data buffer obtained object-level environmental data", "storing in a surrounding state data buffer computed object-level environmental data", "storing in a surrounding state data buffer obtained environmental data" and/or "storing in a surrounding state data buffer obtained object-level data". The phrase "object-level environmental data indicating states of vehicle surroundings", on the other hand, may refer to "object-level environmental data indicative of and/or revealing states of vehicle surroundings", "object-level environmental data indicating vehicle surroundings" and/or "corroborated and/or enhanced environmental data indicating states of vehicle surroundings", and according to an example further to "ground-truth and/or baseline environmental data indicating states of vehicle surroundings". Moreover, "environmental data indicating states of vehicle surroundings derived from perception data" may refer to "environmental data indicating states of vehicle surroundings derived from a range of perception data", and according to an example further to "environmental data indicating states of vehicle surroundings derived from post-processing of—and/or running through at least a first backward filter—perception data". The phrase "perception data output from an onboard perception system", on the other hand, may refer to "perception data as perceived by an onboard perception system", "world views as perceived by an onboard perception system", "perception data continuously and/or intermittently output from an onboard perception system", whereas "output from a perception system configured to estimate surroundings of said vehicle" may refer to "output from a perception system configured to estimate surroundings of said vehicle with support from one or more surrounding detecting sensors" and/or "output from a perception system of said vehicle and/or said ADS".

As illustrated in an exemplifying manner in exemplifying FIG. 1, the image frames handling system 1 is further—e.g. by means of an image frames storing unit 102—adapted and/or configured for storing in an image data buffer 220 at a predeterminable frame rate, image frames of vehicle surroundings captured by the image capturing device 22. Thereby, in addition to there being stored object-level environmental data indicating states of vehicle surroundings, there is in parallel continuously and/or intermittently buffered onboard the vehicle 2—e.g. at full frame rate—images of the vehicle's 2 surroundings derived from at least a first onboard image capturing device 22 e.g. represented by a camera.

The predeterminable frame rate at which the image frames are stored may be represented by any feasible rate and/or frequency, for instance full frame rate, meaning that every captured image frame—or essentially every captured image frame—is stored. The image frames may be represented by any feasible images and/or image data of the vehicle's 2 surroundings, be of any feasible format and/or size, and further amount to any feasible number of frames. The image frames may furthermore be—and/or have been—obtained from the image capturing device 22 in any feasible—e.g. known—manner. Moreover, the image frames may be stored in any arbitrary feasible—e.g. known—manner onboard the vehicle 2, and similarly, the image data buffer 220—which e.g. may be referred to as merely data buffer—may be represented by any arbitrary number of buffers of any feasible size(s). Moreover, the image frames stored, may cover any feasible time period, of any feasible duration, for instance ranging from a few seconds or even less than a second, up to tens of seconds or even minutes, and furthermore cover and/or overlap at least a portion and/or time range of the time period of the stored object-level environmental data indicative of states of vehicle surroundings. Thus, optionally, the surrounding state data buffer 230 and the image data buffer 220 may cover a respective predeterminable time duration at least partly overlapping in time. Thereby, object-level environmental data indicating states of vehicle surroundings and image frames of vehicle surroundings may at least partly relate to the same moment and/or moments in time. The phrase "storing in an image data buffer [ . . . ] image frames" may refer to "storing in an at least first image data buffer [ . . . ] image frames", "buffering [ . . . ] image frames", "storing continuously and/or intermittently in an image data buffer [ . . . ] image frames", "storing in a data buffer e.g. ring data buffer [ . . . ] image frames", "storing onboard said vehicle in an image data buffer [ . . . ] image frames" and/or "storing in an image data buffer [ . . . ] obtained and/or derived image frames". The phrase "at a predeterminable frame rate", on the other hand, may refer to "at a set frame rate", and according to an example further to "at a full—or essentially full—frame rate". Moreover, "captured by said image capturing device" may refer to "obtained by and/or from said image capturing device".

Optionally, and as illustrated in an exemplifying manner in exemplifying FIG. 1, the image frames handling system 1 may further—e.g. by means of an optional event detecting unit 105—be adapted and/or configured for detecting an event—such as a safety critical event—fulfilling triggering criteria stipulating events deemed relevant for initiating provision of vehicle-stored data to the entity 3. Thereby, events of interest for development and/or verification of the ADS 21—such as performance of the ADS 21—may be monitored, for instance by measuring key performance indicators, KPIs, associated with the ADS 21, and detected situations complying with predeterminable situation conditions, such as e.g. insufficient performance of the ADS 21, may be acknowledged and/or captured. Further optionally, and as illustrated in an exemplifying manner in exemplifying FIG. 1, the image frames handling system 1 may further—e.g. by means of an optional buffer freezing unit 104—be adapted and/or configured for, subsequent detecting an event fulfilling the triggering criteria, freezing the surrounding state data buffer 230 and the image data buffer 220. Thereby, following a triggering condition being met, there is frozen and/or selected sets of data of the surrounding state data buffer 230 and image data buffer 220, which respectively may cover a respective period of time prior to, during, and potentially even a respective period of time after occurrence of the event. Potentially, further data buffers—e.g. comprising raw data—associated with and/or from onboard sensors, buses, application interfaces etc.—and/or essentially entire and/or all data in the vehicle 2—may additionally be frozen following detection of an event fulfilling triggering criteria.

The event may be represented by any feasible event such as an ADS performance-related event—e.g. a safety critical event—complying with the triggering criteria, for instance represented by and/or comprising one or more of activation of a vehicle emergency braking system, dropping of a KPI value below a predeterminable KPI threshold, a difference in detected object free area between differing surrounding detecting sensors—such as e.g. camera and lidar—exceeding a predeterminable limit, overriding by a vehicle driver of an active driving mode of the ADS 21, stress level of a vehicle driver exceeding a predeterminable stress level threshold, detection of an animal e.g. a moose on the road, etc. The phrase "detecting an event" may refer to "detecting onboard the vehicle an event", and according to an example further to "detecting a critical event and/or a safety critical event", "detecting an ADS-related event", "detecting an ADS performance-related event", "detecting by monitoring KPIs an event", "detecting by monitoring ADS performance-related KPIs an event". The phrase "triggering criteria", on the other hand, may refer to "predeterminable triggering criteria", "trigger criteria", "event criteria" and/or "at least a first triggering condition". Moreover, "triggering criteria stipulating events deemed relevant for initiating provision of vehicle-stored data to said entity" may refer to "triggering criteria stipulating events deemed relevant for initiating provision of vehicle-stored sensor-related data to said entity", and according to an example further to "triggering criteria stipulating KPI-related conditions" and/or "triggering criteria stipulating ADS performance-related KPI conditions". Moreover, the phrase "stipulating events deemed relevant" may refer to "stipulating events defined relevant", whereas "for initiating provision of vehicle-stored data" may refer to "for triggering provision of vehicle-stored data".

As illustrated in an exemplifying manner in exemplifying FIG. 1, the image frames handling system 1 is further—e.g. by means of a buffer processing unit 105—adapted and/or configured for processing the image data buffer 220 to determine motions of objects in the image frames and respective values of said motions. Thereby, e.g. following detection of an event—e.g. safety critical event—and potentially subsequent a freezing of the surrounding state data buffer 230 and image data buffer 220, the buffered image frames are assessed to establish optical flow(s) therein. Accordingly, there is identified pattern(s) of apparent, significant and/or abrupt motions of objects, surfaces and/or edges in the image frames and/or in regions or pixels thereof—which may signify interesting and/or important information—and gradients of respective motion are computed.

The image data buffer 220 may be processed in any feasible—e.g. known—manner enabling motions of objects—i.e. optical flows—to be identified in the image frames and subsequently respective values—i.e. gradients—of the motions to be computed and/or extracted. Such objects may e.g. be represented by any arbitrary—static and/or dynamic—objects in the vehicle's 2 surroundings captured in one or more image frames. The phrase "processing said image data buffer" may refer to "analyzing and/or assessing said image data buffer" and/or "processing at least a portion of said image data buffer", whereas "to determine motions of objects is said image frames" may refer to "to identify and/or extract motions of objects in said image frames", "to determine an optical flow and/or depth or optical flows and/or depths of objects in said image frames", "to determine apparent, significant, sudden and/or abrupt motions of objects in said image frames", "to determine motions above a predeterminable threshold of objects in said image frames" and/or "to determine motions of objects in at least a portion of said image frames", and according to an example further to "to determine based on pixel values and/or on pixel-level motions of objects in said image frames". Moreover, the phrase "to determine motions of objects in said image frames and respective values of said motions" may refer to "to determine motions of objects in said image frames and extract and/or compute respective values of said motions", "to determine motions of objects in said image frames and respective gradients of said motions" and/or "to determine motions of objects in said image frames and values of said motions".

As illustrated in an exemplifying manner in exemplifying FIG. 1, the image frames handling system 1 is further—e.g. by means of a key frames extracting unit 106—adapted and/or configured for extracting key image frames from the image data buffer 220. Thereby, there is selected and/or identified out of the image data buffer 220—e.g. based on predeterminable selection criteria and/or a set frequency—image frames which may be referred to as key, core and/or selected image frames, with the remaining image frames being considered and/or referred to as non-key and/or dropped image frames.

The key image frames may be extracted and/or selected from the image data buffer 220 in any feasible—e.g. known—manner, for instance based on predeterminable selection criteria and/or conditions, which for instance may be set in view of and/or based on storage capacity and/or bandwidth connection capacity, and/or be represented by a—e.g. adjustable—set frequency, such as e.g. every second image frame. The phrase "extracting key image frames" may refer to "selecting, filtering out, identifying, pinpointing and/or determining key image frames" and/or "extracting core image frames", and according to an example further to "extracting based on predeterminable selection criteria and/or a predeterminable frequency, key image frames".

As illustrated in an exemplifying manner in exemplifying FIG. 1, the image frames handling system 1 is further—e.g. by means of a pixels extracting unit 107—adapted and/or configured for extracting from non-key image frames of the image data buffer 220, pixels comprising motion values exceeding a predeterminable level. Thereby, there is selected in dropped image frames, respective pixels and/or pixel regions having and/or being associated with gradients of the optical flow exceeding a set motion value threshold and/or limit. Accordingly, pixels and/or regions with sufficient motion values—which may signify interesting and/or important information and further be referred to as hot spots—are filtered out from the non-key image frames.

The predeterminable level may be set to any desired limit, and may for instance be represented by any feasible motion value threshold deemed sufficient and/or relevant for filtering out pixels with apparent, significant and/or abrupt changes and/or motions. The phrase "extracting from non-key image frames" may refer to "selecting, filtering out, identifying, pinpointing and/or determining from non-key image frames", "extracting out of non-key image frames" and/or "extracting from dropped image frames", and according to an example further to "extracting from all—or essentially all—non-key image frames" and/or "extracting from a predeterminable portion of the non-key image frames". Moreover, "pixels comprising motion values" may refer to "pixels and/or pixel regions comprising motion values" and/or "pixels and/or pixel regions comprising motion values, and/or pixels near and/or in vicinity of pixels comprising motion values". The phrase "motion values exceeding a predeterminable level", on the other hand, may refer to "motion values above a—e.g. adjustable—set threshold" and/or "motion values exceeding a minimum motion value level".

As illustrated in an exemplifying manner in exemplifying FIG. 1, the image frames handling system 1 is further—e.g. by means of a transferring unit 108—adapted and/or configured for transferring to the entity 3 selected data comprising the surrounding state data buffer 230, the extracted key image frames and the extracted pixels. Thereby, in addition to the object-level environmental data of the surrounding state data buffer 230 being offloaded to the offboard entity 3, there is additionally offloaded to said entity 3—rather than the entire image data buffer 220—the key image frames thereof at full resolution along with the non-key image frames extracted pixels having motion values exceeding the set motion value threshold. Accordingly, data of interest for further assessment, analysis, processing and/or resimulation at the offboard entity 3, may be transmitted with a limited and/or reduced data volume, in that—although the surrounding state data buffer 230 is provided to said entity 3 at full and/or high sampling rate—the image frames are provided to said entity 3 at a downsampled rate, i.e. at a limited e.g. lower frame rate, with merely the key image frames—and not the dropped frames—being transmitted at full resolution.

The selected data—comprising at least a portion of the surrounding state data buffer 230, at least a portion of the extracted key image frames and at least a portion of the extracted pixels—may be transferred in any feasible manner, e.g. wirelessly such as e.g. via Wi-Fi, 4G, LTE, 5G etc. and/or through wired data transmission such as via powerline communication e.g. through a charging cable of the vehicle 2, and further at any arbitrary feasible point in time e.g. deemed sufficient and/or relevant e.g. in view of available bandwidth connection capacity. The selected data may moreover be packaged in any feasible—e.g. known—manner prior to being transferred to the offboard entity 3. Optionally, the selected data may further comprise determined motions of objects in non-key image frames. Thereby, optical flow of dropped image frames—thus not limited to sudden motions—may additionally be included in the selected data transferred to the offboard entity 3, i.e. the determined motions in the stored image frames may be transferred at full frame rate. Moreover, the selected data may potentially comprise additional data, such as data—e.g. raw sensor data—comprised in the same or one or more further data buffers, for instance from and/or associated with one or more further onboard sensors e.g. surrounding detecting sensors, buses, application interfaces etc., and/or or essentially entire and/or all data in the vehicle 2. The phrase "transferring to said entity" may refer to "offloading, providing, transmitting, sending and/or communicating to said entity", whereas "selected data" according to an example may refer to "selected packaged data". The phrase "selected data comprising the surrounding state data buffer 230, the extracted key image frames and the extracted pixels" may refer to "selected data comprising a respective at least portion of the surrounding state data buffer 230, the extracted key image frames and the extracted pixels". Moreover, according to an example, the phrase "transferring to said entity selected data comprising the surrounding state data buffer, the extracted key image frames and the extracted pixels" may refer to "transferring to said entity selected data comprising the surrounding state data buffer, the extracted key image frames and the extracted pixels, packaged", whereas "the extracted pixels" may refer to "the extracted pixels and/or the hot spots of the non-key image frames". Furthermore, "selected data further comprising determined motions of objects in non-key image frames" may refer to "selected data further comprising determined motions and/or optical flow at the predeterminable frame rate".

As illustrated in an exemplifying manner in exemplifying FIG. 1, the image frames handling system 1 is further—e.g. by means of a reconstructing unit 109—adapted and/or configured for reconstructing at the entity 3, interpolated image frames at the predeterminable frame rate, based on the selected data. Thereby, images—such as the dropped image frames—may be reconstructed based on the key image frames in combination with the—in the non-key image frames comprised—pixels comprising motion values exceeding the predeterminable level and the—in the surrounding state data buffer 230 comprised—object-level environmental data indicating states of vehicle surroundings. Accordingly, images in between key image frames may be reconstructed and/or interpolated to increase the image frame rate and/or reach the predeterminable—e.g. full—frame rate, using as input the key image frames along with the non-key image frames pixels with sufficient value/ gradient of optical flow, and the world views e.g. baseline world views. For instance, for plural time stamps, there may be interpolated a respective specific image frame of a specific time stamp based on key image frames of neighbouring time stamps in combination with non-key image frame extracted pixels at said specific time stamp—which raw image data enables reconstructing a more realistic interpolated image frame—and object-level environmental data of said specific time stamp. The introduced concept thus suggests transferring key frames with full resolution—to not lose information—and dropping e.g. middle frames that can be reconstructed with a high resolution using the object-level environmental data and pixels at hot spots. This subsequently enables accurately reconstructing images at the offboard entity 3, e.g. back office, while at the same time minimizing the risk of missing objects or important information in dropped images. In other words, there is provided an approach that—as compared to offloading image frames at full frame rate—substantially may reduce the size of data required to be offloaded from the vehicle 2, while at the same time preserving essential characteristics and/or information of such image frames and enabling constructing said image frames at a—e.g. full—frame rate at the offboard entity 3, with high accuracy.

Thus, with the suggested approach, there is transferred from the vehicle 2 to the offboard entity 3, lowered frame rate image frames—i.e. the key image frames—together with the non-key image frames extracted pixels and the surrounding state data buffer 230, to enable restoring the predeterminable e.g. full frame rate data with sufficient accuracy at the offboard entity 3. That is, there is suggested to construct object-level environmental data of vehicle surroundings—e.g. a baseline worldview—in the vehicle 2 and send it at a high sampling rate together with the downsampled image data buffer 220 to the offboard entity 3, in order to at said entity 3 enable reconstruction of images at a predeterminable e.g. full frame rate. This enables the reconstruction process to consume the information in the object-level environmental data to ensure that important features are preserved in the reconstructed images. Accordingly, there is enabled reconstruction of all the frames with high resolution and/or accuracy at the offboard entity 3 without losing e.g. safety critical information in the dropped frames. That is, dropping images and reconstructing the dropped images at the offboard entity 3 only based on neighbouring frames, would potentially cause missing some important objects and/or events in the dropped frames. To circumvent this problem, there is thus suggested to use object-level environmental data of vehicle surroundings to reconstruct the dropped images and make sure that at least e.g. safety critical events are captured in the reconstructed image(s). In the vehicle 2, optical flows are extracted from the stored image frames at the predeterminable e.g. full frame rate, thus enabling detection of regions in an image frame with high gradients of the optical flow, or significant motion, which commonly contain interesting and/or important information. Then transferring pixels around such regions to the offboard entity 3 as input to the reconstruction process, enables accuracy of the reconstructed images to be increased.

Reconstructing interpolated image frames at the entity at the predeterminable e.g. full frame rate based on the selected data, may be carried out in any feasible manner. Optionally, however, and as illustrated in an exemplifying manner in exemplifying FIG. 3, an at least first image frame $ri_0$ of at least a first time stamp $t_0$ may be reconstructed based on key image frames $ki_{-1}$, $ki_{+1}$ of neighbouring time stamps $t_{-1}$, $t_{+1}$ data $ss_0$ of the surrounding state data buffer 230 pertinent the at least first time stamp $t_0$ and the extracted pixels $ep_0$ pertinent said at least first time stamp $t_0$. As illustrated in an exemplifying manner, neighbouring key frames $ki_{-1}$, $ki_{+1}$ are used to construct an interpolated image $ii_0$ pertinent time stamp $t_0$. This may for instance be accomplished by reconstructing a 3D scene of the environment, for instance subsequent extracting optical flow and/or depth for the neighbouring key frames $ki_{-1}$, $ki_{+1}$. Potentially, should the selected data optionally comprise determined motions of objects in non-kay image frames, i.e. should the optical flow have been transferred at full frame rate, then reconstruction of the interpolated image $ii_0$ may for instance be accomplished by creating a point cloud pertinent time stamp $t_0$, using triangulation or 3D scene reconstruction e.g. with RGB-D information. However, as discussed above, this interpolated image $ii_0$ may be inaccurate and miss important information about the surrounding environment of the vehicle 2. Thus, the interpolated image $ii_0$ together with baseline world view $ss_0$ at time stamp $t_0$ and extracted pixels $ep_0$ around the hot spots from the raw image at time stamp $ep_0$, are fed to an—e.g. known—image reconstruction method and/or algorithm(s) 4—for instance a Generative Adverserial Network—to restore more realistic and accurate estimation of the dropped image. Then—e.g. known—image enhancement techniques 5—such as hole filling or deblurring—may be used to increase the quality of the reconstructed image $ri_o$.

Figure 3:
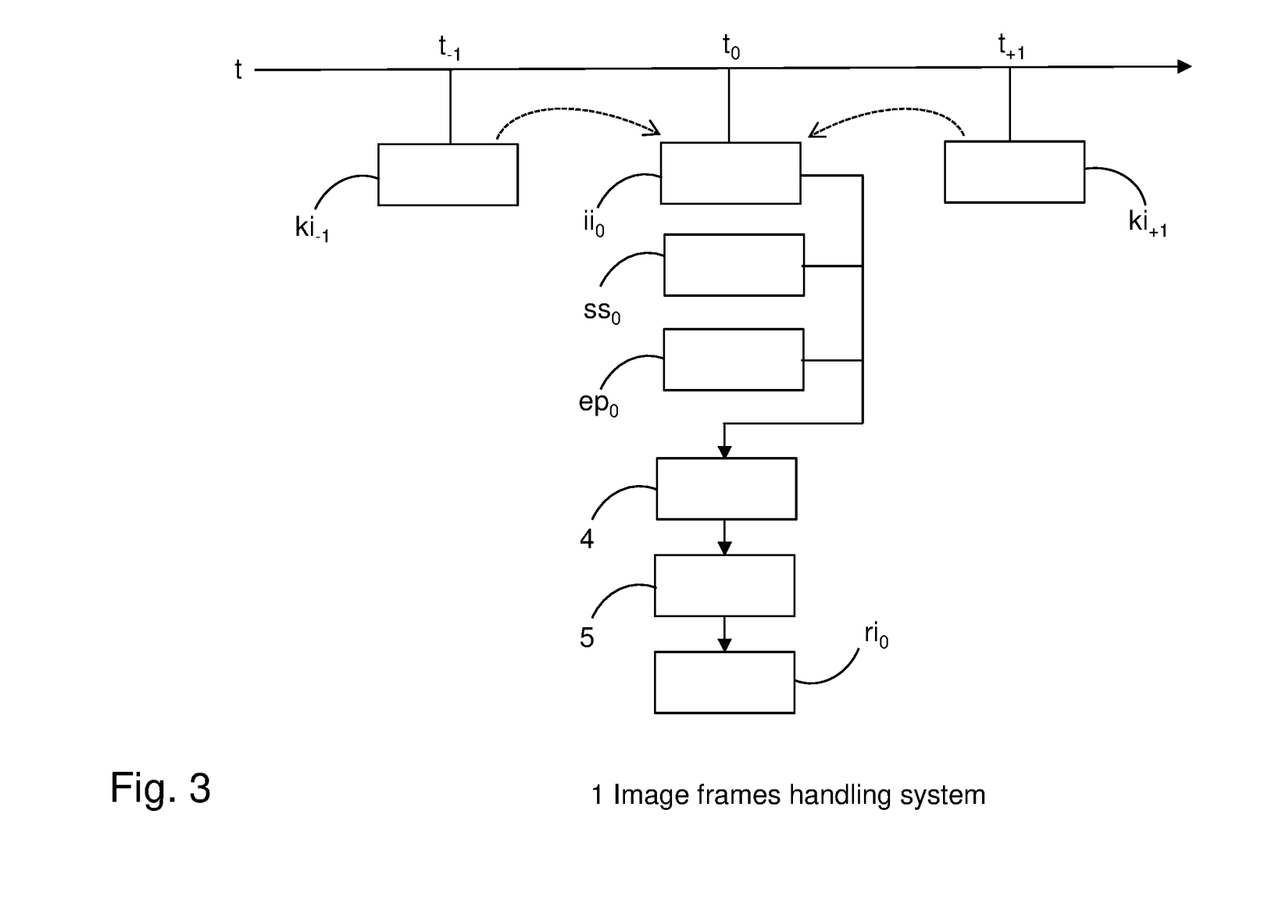
FIG. 3 depicts a schematic view of exemplifying offboard-related activities of an image frames handling system according to embodiments of the disclosure.

The reconstructed interpolated image frames subsequently enabling restoring of the predeterminable—e.g. full—frame rate at the offboard entity 3, may for instance be utilized for visualization and/or resimulation such as of the full SW stack, e.g. of the potentially detected event and/or for fault trace purposes, and/or for deep learning training, etc. The phrase "reconstructing at said entity interpolated image frames" may refer to "reconstructing at said entity interpolated images", "reconstructing at said entity images in between key image frames" and/or "reconstructing at said entity at least a first interpolated image frame", whereas "at said predeterminable frame rate" may refer to "to reach said predeterminable frame rate" and according to an example further to "at full frame rate". The phrase "based on said selected data", on the other hand, may refer to "with input from said selected data" and/or "based on—and/or with input from—the surrounding state data buffer 230, the extracted key image frames and the extracted pixels". According to an example, the phrase "reconstructing at said entity interpolated image frames at said predeterminable frame rate based on said selected data" may refer to and/or comprise "reconstructing at said entity—at least a portion of—the non-key image frames based on said selected data" and/or "upscaling and/or upsampling at said entity the key image frames to said predeterminable frame rate based on said selected data". Moreover, "at least a first image frame" may refer to "at least a first reconstructed and/or interpolated image frame", whereas "extracted pixels pertinent said at least first time stamp" may refer to "extracted pixels of non-key image frames pertinent said at least first time stamp".

As further shown in FIG. 1, the image frames handling system 1 comprises a surrounding state storing unit 101, an image frames storing unit 102, an optional event detecting unit 103, an optional buffer freezing unit 104, a buffer processing unit 105, a key frames extracting unit 106, a pixels extracting unit 107, a transferring unit 108 and a reconstructing unit 109, all of which already have been described in greater detail above. Furthermore, the embodiments herein for reconstruction at an entity 3 offboard a vehicle 2 of image frames obtained by an image capturing device 22 of an ADS 21 of said vehicle 2, may be implemented through one or more processors, such as a processor 110, for instance represented by at least a first Central Processing Unit, CPU, at least a first Graphics Processing Unit, GPU, at least a first Tensor Processing Unit, TPU, and/or at least a first Field-Programmable Gate Array, FPGA, together with computer program code for performing the functions and actions of the embodiments herein. Said program code may also be provided as a computer program product, for instance in the form of a data carrier carrying computer program code for performing the embodiments herein when being loaded into the image frames handling system 1. One such carrier may be in the form of a CD/DVD ROM disc and/or a hard drive, it is however feasible with other data carriers. The computer program code may furthermore be provided as pure program code on a server and downloaded to the image frames handling system 1. The image frames handling system 1 may further comprise a memory 111 comprising one or more memory units. The memory 111 optionally includes high-speed random access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory 111 may be arranged to be used to store e.g. information, and further to store data, configurations, scheduling, and applications, to perform the methods herein when being executed in the image frames handling system 1. For instance, the computer program code may be implemented in the firmware, stored in FLASH memory 111, of an embedded processor 110, and/or downloaded wirelessly e.g. from an off-board server. Furthermore, units 101-109, the optional processor 110 and/or the optional memory 111, may at least partly be comprised in one or more nodes 112 e.g. ECUs of the vehicle 2, e.g. in and/or in association with the ADS 21, and/or at least partly at an entity 3 offboard the vehicle 2. Those skilled in the art will also appreciate that said units 101-109 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 111, that when executed by the one or more processors such as the processor 110 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 2:
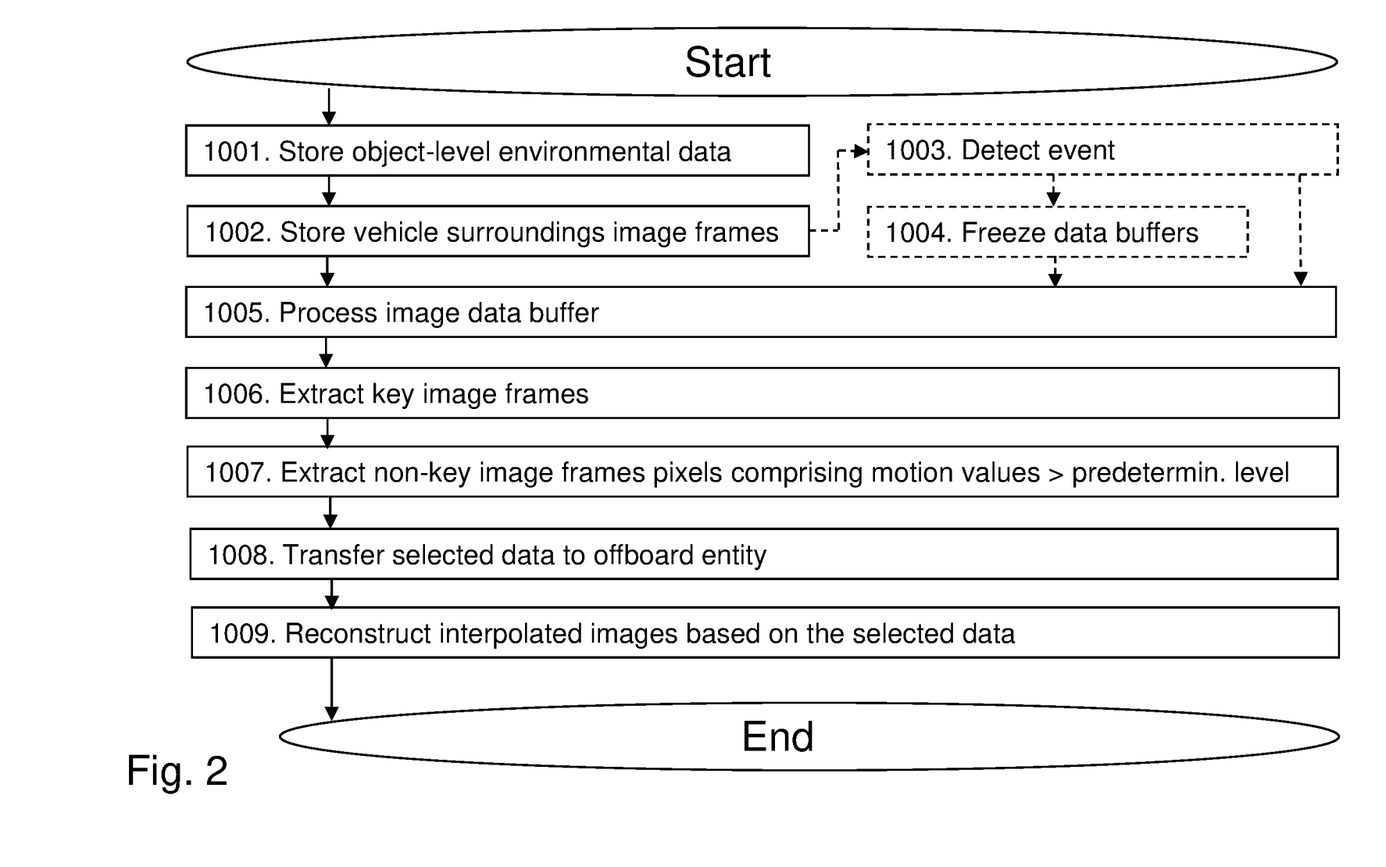
FIG. 2 is a flowchart depicting an exemplifying method performed by an image frames handling system according to embodiments of the disclosure.

FIG. 2 is a flowchart depicting an exemplifying method performed by an image frames handling system 1 according to embodiments of the disclosure. Said method is for reconstruction at an entity 3 offboard a vehicle 2 of image frames obtained by an image capturing device 22 of an ADS 21 of said vehicle 2. The exemplifying method, which may be continuously repeated, comprises one or more of the following actions discussed with support from FIGS. 1 and 3. Moreover, the actions may be taken in any suitable order and/or one or more actions may be performed simultaneously and/or in alternate order where applicable. For instance, Actions 1001 and 1002 may be performed in alternate order and/or simultaneously.

Action 1001

In Action 1001, the image frames handling system 1 stores—e.g. with support from the surrounding state storing unit 101—in a surrounding state data buffer 230, obtained object-level environmental data indicating states of vehicle surroundings derived from perception data output from an onboard perception system 23 configured to estimate surroundings of the vehicle 2.

Action 1002

In Action 1002, the image frames handling system 1 stores—e.g. with support from the image frames storing unit 102—in an image data buffer 220, at a predeterminable frame rate, image frames of vehicle surroundings captured by the image capturing device 22.

Optionally, the surrounding state data buffer 230 and the image data buffer 220 cover a respective predeterminable time duration at least partly overlapping in time.

Action 1003

In optional Action 1003, the image frames handling system 1 may detect—e.g. with support from the optional event detecting unit 103—an event fulfilling triggering criteria stipulating events deemed relevant for initiating provision of vehicle-stored data to the entity 3.

Action 1004

In optional Action 1004, the image frames handling system 1 may freeze—e.g. with support from the optional buffer freezing unit 104—the surrounding state data buffer 230 and the image data buffer 220.

Action 1005

In Action 1005, the image frames handling system 1 processes—e.g. with support from the buffer processing unit 105—the image data buffer 220 to determine motions of objects in the image frames and respective values of said motions.

Action 1006

In Action 1006, the image frames handling system 1 extracts—e.g. with support from the key frames extracting unit 106—key image frames from the image data buffer 220.

Action 1007

In Action 1007, the image frames handling system 1 extracts—e.g. with support from the pixels extracting unit 107—from non-key image frames of the image data buffer 220, pixels comprising motion values exceeding a predeterminable level.

Action 1008

In Action 1008, the image frames handling system 1 transfers—e.g. with support from the transferring unit 108—to the entity 3, selected data comprising the surrounding state data buffer 230, the extracted key image frames and the extracted pixels.

Optionally, Action 1008 of transferring selected data may comprise—and/or the transferring unit 108 may be adapted and/or configured for—transferring selected data further comprising determined motions of objects in non-key image frames.

Action 1009

In Action 1009, the image frames handling system 1 reconstructs—e.g. with support from the reconstructing unit 109—at the entity 3, interpolated image frames at the predeterminable frame rate based on the selected data.

Optionally, Action 1009 of reconstructing interpolated image frames may comprise— and/or the reconstructing unit 109 may be adapted and/or configured for—at least a first image frame $ri_0$ of at least a first time stamp $t_0$ being reconstructed based on:

key image frames of neighbouring time stamps $t_{-1}$, $t_{+1}$, data $(ss_0)$ of the surrounding state data buffer 230 pertinent the at least first time stamp $t_0$; and the extracted pixels $ep_0$ pertinent the at least first time stamp $t_0$.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by an image frames handling system for reconstruction at an entity offboard a vehicle of image frames obtained by an image capturing device of an Automated Driving System, ADS, of said vehicle, the method comprising:

storing in a surrounding state data buffer obtained object-level environmental data indicating states of vehicle surroundings derived from perception data output from an onboard perception system;

storing in an image data buffer at a predeterminable frame rate, image frames of vehicle surroundings captured by the image capturing device, the image frames depicting objects;

processing the image data buffer to determine motions of the objects depicted in the image frames and respective values of the motions;

extracting key image frames from the image data buffer, the key image frames being images frames in the image data buffer that meet predefined selection criteria;

extracting from non-key image frames of the image data buffer, pixels comprising motion values exceeding a predeterminable level, the non-key image frames being images frames in the image data buffer that do not meet the predefined selection criteria, the extracted pixels of the non-key image frames corresponding to gradients of optical flow indicative of motion;

transferring to the entity selected data comprising the surrounding state data buffer, the extracted key image frames and the extracted pixels; and reconstructing at the entity interpolated image frames at the predeterminable frame rate based on the selected data, the reconstructing the interpolated image frames comprising at least a first image frame $(ri_0)$ of at least a first time stamp $(t_0)$ reconstructed based on:

key image frames $(k_{-1}, k_{+1})$ of neighbouring time stamps $(t_{-1}, t_{+1})$;

data $(ss_0)$ of the surrounding state data buffer pertinent the at least first time stamp $(t_0)$; and the extracted pixels $(ep_0)$ pertinent the at least first time stamp $(t_0)$.

2. The method according to claim 1, further comprising:
detecting an event fulfilling triggering criteria stipulating events deemed relevant for initiating provision of vehicle-stored data to the entity.

3. The method according to claim 2, further comprising:
freezing the surrounding state data buffer and the image data buffer.

4. The method according to claim 1, wherein the transferring comprises transferring selected data further comprising determined motions of objects in non-key image frames.

5. The method according to claim 1, wherein the surrounding state data buffer and the image data buffer cover a respective predeterminable time duration at least partly overlapping in time.

6. The method according to claim 1, further comprising:
detecting an event fulfilling triggering criteria stipulating events deemed relevant for initiating provision of vehicle-stored data to the entity.

7. The method according to claim 6, further comprising:
freezing the surrounding state data buffer and the image data buffer.

8. The method according to claim 1, wherein the transferring comprises transferring selected data further comprising determined motions of objects in non-key image frames.

9. The method according to claim 1, wherein the surrounding state data buffer and the image data buffer cover a respective predeterminable time duration at least partly overlapping in time.

10. An image frames handling system for reconstruction at an entity offboard a vehicle of image frames obtained by an image capturing device of an Automated Driving System, ADS, of the vehicle, the image frames handling system comprising at least one processor configured to:

store in a surrounding state data buffer obtained object-level environmental data indicating states of vehicle surroundings derived from perception data output from an onboard perception system;

store in an image data buffer at a predeterminable frame rate, image frames of vehicle surroundings captured by the image capturing device, the image frames depicting objects;

process the image data buffer to determine motions of the objects depicted in the image frames and respective values of the motions;

extract key image frames from the image data buffer, the key image frames being images frames in the image data buffer that meet predefined selection criteria;

extract from non-key image frames of the image data buffer, pixels comprising motion values exceeding a predeterminable level, the non-key image frames being images frames in the image data buffer that do not meet the predefined selection criteria, the extracted pixels of the non-key image frames corresponding to gradients of optical flow indicative of motion;

transfer to the entity selected data comprising the surrounding state data buffer, the extracted key image frames and the extracted pixels; and reconstruct at the entity interpolated image frames at the predeterminable frame rate based on the selected data, the reconstructing the interpolated image frames comprising at least a first image frame ($ri_0$) of at least a first time stamp ($t_0$) reconstructed based on:
  key image frames ($k_{-1}$, $k_{+1}$) of neighbouring time stamps ($t_{-1}$, $t_{+1}$);
  data ($ss_0$) of the surrounding state data buffer pertinent the at least first time stamp ($t_0$); and
  the extracted pixels ($ep_0$) pertinent the at least first time stamp ($t_0$).

11. The image frames handling system according to claim 10, wherein the at least one processor is further configured to:
  detect an event fulfilling triggering criteria stipulating events deemed relevant for initiating provision of vehicle-stored data to the entity.

12. The image frames handling system according to claim 11, wherein the at least one processor is further configured to:
  freeze the surrounding state data buffer and the image data buffer.

13. The image frames handling system according to claim 10, wherein the at least one processor is further configured to:
  detect an event fulfilling triggering criteria stipulating events deemed relevant for initiating provision of vehicle-stored data to the entity.

14. The image frames handling system according to claim 13, wherein the at least one processor is further configured to:
  freeze the surrounding state data buffer and the image data buffer.

15. The image frames handling system according to claim 10, wherein the at least one processor is configured to transfer selected data further comprising determined motions of objects in non-key image frames.

16. The image frames handling system according to claim 10, wherein the surrounding state data buffer and the image data buffer cover a respective predeterminable time duration at least partly overlapping in time.

17. A system comprising one or both of:
a vehicle, the vehicle comprising at least one processor configured to:
  store in a surrounding state data buffer obtained object-level environmental data indicating states of vehicle surroundings derived from perception data output from an onboard perception system;
  store in an image data buffer at a predeterminable frame rate, image frames of vehicle surroundings captured by the image capturing device, the image frames depicting objects;
  process the image data buffer to determine motions of the objects depicted in the image frames and respective values of the motions;
  extract key image frames from the image data buffer, the key image frames being images frames in the image data buffer that meet predefined selection criteria;
  extract from non-key image frames of the image data buffer, pixels comprising motion values exceeding a predeterminable level, the non-key image frames being images frames in the image data buffer that do not meet the predefined selection criteria, the extracted pixels of the non-key image frames corresponding to gradients of optical flow indicative of motion; and
  transfer to an entity selected data comprising the surrounding state data buffer, the extracted key image frames and the extracted pixels; and
the entity, the entity being separate from the vehicle, the entity comprising at least one processor configured to reconstruct interpolated image frames at the predeterminable frame rate based on the selected data, the reconstructing the interpolated image frames comprising at least a first image frame ($ri_0$) of at least a first time stamp ($t_0$) reconstructed based on:
  key image frames ($k_{-1}$, $k_{+1}$) of neighbouring time stamps ($t_{-1}$, $t_{+1}$);
  data ($ss_0$) of the surrounding state data buffer pertinent the at least first time stamp ($t_0$); and
  the extracted pixels ($ep_0$) pertinent the at least first time stamp ($t_0$).

18. A non-transitory computer storage medium storing a computer program containing computer program code arranged to cause a computer or a processor to perform a method for reconstruction at an entity offboard a vehicle of image frames obtained by an image capturing device of an Automated Driving System, ADS, of said vehicle, the method comprising:
  storing in a surrounding state data buffer obtained object-level environmental data indicating states of vehicle surroundings derived from perception data output from an onboard perception system;
  storing in an image data buffer at a predeterminable frame rate, image frames of vehicle surroundings captured by the image capturing device, the image frames depicting objects;
  processing the image data buffer to determine motions of the objects depicted in the image frames and respective values of the motions;
  extracting key image frames from the image data buffer, the key image frames being images frames in the image data buffer that meet predefined selection criteria;
  extracting from non-key image frames of the image data buffer, pixels comprising motion values exceeding a predeterminable level, the non-key image frames being images frames in the image data buffer that do not meet the predefined selection criteria, the extracted pixels of the non-key image frames corresponding to gradients of optical flow indicative of motion;

transferring to the entity selected data comprising the surrounding state data buffer, the extracted key image frames and the extracted pixels; and reconstructing at the entity interpolated image frames at the predeterminable frame rate based on the selected data, the reconstructing the interpolated image frames comprising at least a first image frame ($ri_0$) of at least a first time stamp ($t_0$) reconstructed based on:

key image frames ($k_{-1}$, $k_{+1}$) of neighbouring time stamps ($t_{-1}$, $t_{+1}$);

data ($ss_0$) of the surrounding state data buffer pertinent the at least first time stamp ($t_0$); and the extracted pixels ($ep_0$) pertinent the at least first time stamp ($t_0$).

\* \* \* \* \*